(12) United States Patent
Edgar et al.

(10) Patent No.: US 6,720,560 B1
(45) Date of Patent: Apr. 13, 2004

(54) METHOD AND APPARATUS FOR SCANNING IMAGES

(75) Inventors: Albert D. Edgar, Austin, TX (US); Steven C. Penn, Georgetown, TX (US)

(73) Assignee: Eastman Kodak Company, Rochester, NY (US)

(*) Notice: Subject to any disclaimer, the term of this patent is extended or adjusted under 35 U.S.C. 154(b) by 133 days.

(21) Appl. No.: 09/702,388

(22) Filed: Oct. 31, 2000

Related U.S. Application Data

(60) Provisional application No. 60/174,067, filed on Dec. 30, 1999.

(51) Int. Cl.[7] ............................................. G01N 21/00
(52) U.S. Cl. ................. 250/341.8; 250/349; 250/339.11
(58) Field of Search ......................... 250/341.8, 340, 250/341, 349, 339.11, 910, 330, 341.7; 356/239.1, 51, 237.1, 419; 382/275, 191, 272, 318; 396/309

(56) References Cited

U.S. PATENT DOCUMENTS

| | | | |
|---|---|---|---|
| 3,748,471 A * | 7/1973 | Ross et al. ................. 250/340 |
| 4,260,899 A | 4/1981 | Baker ......................... 250/563 |

(List continued on next page.)

FOREIGN PATENT DOCUMENTS

| DE | 28 21 868 A1 | 11/1979 | ........... G01N/21/32 |
|---|---|---|---|
| DE | 196 36 867 C1 | 1/1998 | ........... H04N/5/21 |
| EP | 1 547 811 | 6/1979 | ........... H04N/3/36 |
| EP | 0 422 220 A1 | 4/1991 | ........... A61B/6/03 |
| 4,301,469 A | | 11/1981 | Modeen et al. ............. 358/75 |
| 4,302,108 A | | 11/1981 | Timson ...................... 356/359 |
| 4,462,860 A | | 7/1984 | Szmanda ..................... 156/626 |

| 4,665,004 A * | 5/1987 | Drexler ...................... 430/140 |
|---|---|---|
| 4,670,779 A | 6/1987 | Nagano ........................ 358/75 |
| 4,677,465 A | 6/1987 | Alkofer ....................... 358/80 |
| 4,680,638 A | 7/1987 | Childs ........................ 358/214 |
| 4,700,229 A | 10/1987 | Herrmann et al. .......... 358/166 |
| 4,775,238 A | 10/1988 | Weber ......................... 356/431 |
| 4,796,061 A | 1/1989 | Ikeda et al. .................. 355/73 |
| 4,845,551 A | 7/1989 | Matsumoto .................. 358/80 |
| 4,933,566 A | 6/1990 | Masaaki et al. ............ 250/563 |
| 4,937,720 A | 6/1990 | Kirchberg .................... 363/41 |
| 4,969,045 A | 11/1990 | Haruki et al. ............... 358/228 |
| 4,972,091 A | 11/1990 | Cielo et al. ................. 250/562 |
| 4,989,973 A | 2/1991 | Noso et al. .................. 356/239 |
| 4,994,918 A | 2/1991 | Lingemann .................. 358/214 |
| 5,003,379 A | 3/1991 | Moore, Jr. et al. ............ 358/54 |
| 5,010,401 A | 4/1991 | Murakami et al. .......... 358/136 |
| 5,047,968 A | 9/1991 | Carrington et al. .......... 364/574 |
| 5,058,982 A | 10/1991 | Katzir ......................... 385/33 |
| 5,091,972 A | 2/1992 | Kwon et al. .................. 382/54 |
| 5,097,521 A | 3/1992 | Massmann .................... 382/54 |
| 5,149,960 A | 9/1992 | Dunne et al. ................ 250/226 |
| 5,155,596 A | 10/1992 | Kurtz et al. ................. 358/214 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

*Primary Examiner*—Constantine Hannaher
*Assistant Examiner*—Otilia Gabor
(74) *Attorney, Agent, or Firm*—David A. Novais

(57) ABSTRACT

A method for generating a digital representation of an image by scanning the image with two different types of light. A system for use in generating a digital representation of an image, as well as digital representation of an image are also provided.

34 Claims, 2 Drawing Sheets

U.S. PATENT DOCUMENTS

| | | | |
|---|---|---|---|
| 5,200,817 A | 4/1993 | Birnbaum | 358/80 |
| 5,266,805 A | 11/1993 | Edgar | |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,319,719 A * | 6/1994 | Nakazawa et al. | 382/6 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,014,222 A * | 1/2000 | Borggaard et al. | 356/419 |
| 6,057,040 A | 5/2000 | Hage | 428/447 |
| 6,075,590 A | 6/2000 | Edgar | |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |
| 6,407,829 B1 * | 6/2002 | Nakamura | 258/494 |
| 2001/0035491 A1 * | 11/2001 | Ochiai et al. | 250/340 |
| 2001/0052932 A1 * | 12/2001 | Young, Jr. et al. | 348/96 |
| 2001/0055105 A1 * | 12/2001 | Katakura et al. | 355/53 |
| 2002/0001407 A1 * | 1/2002 | Uchida | 382/162 |
| 2002/0056804 A1 * | 5/2002 | Konagaya | 250/208.1 |
| 2002/0071141 A1 * | 6/2002 | Katakura et al. | 358/474 |
| 2002/0131649 A1 * | 9/2002 | Yamaguchi | 382/275 |

FOREIGN PATENT DOCUMENTS

| | | | | |
|---|---|---|---|---|
| EP | 0 482 790 B1 | 4/1992 | | H04N/1/40 |
| EP | 0 527 097 A2 | 2/1993 | | H04N/1/40 |
| EP | 0 569 142 A1 | 11/1993 | | H04N/5/253 |
| EP | 0 624 848 A2 | 11/1994 | | G06F/15/68 |
| EP | 0 699 753 A2 | 8/1995 | | H04N/1/407 |
| EP | 0 716 538 A2 | 6/1996 | | H04N/1/50 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |
| EP | 0 816 833 A3 | 8/1998 | | G01N/21/88 |
| EP | 0 893 914 A2 | 1/1999 | | H04N/5/253 |
| GB | 2 283 633 A | 5/1995 | | H04N/5/262 |
| JP | 4-291139 | 10/1992 | | G01N/21/89 |
| JP | 11185028 | 7/1999 | | G06T/1/00 |
| JP | 2000-13604 | 1/2000 | | H04N/1/409 |
| JP | 2000-196813 A | 7/2000 | | |
| WO | WO 84/02019 | 5/1984 | | G06F/15/20 |
| WO | WO 89/06890 | 7/1989 | | H04N/3/36 |
| WO | WO 90/01240 | 2/1990 | | H04N/1/40 |
| WO | WO 91/09493 | 6/1991 | | H04N/5/127 |
| WO | WO 92/05469 | 4/1992 | | G03B/27/53 |
| WO | WO 95/15530 | 6/1995 | | G06F/17/14 |
| WO | WO 97/16028 | 5/1997 | | H04N/7/30 |
| WO | 9825399 | 6/1998 | | |
| WO | 9831142 | 7/1998 | | |
| WO | WO 98/31142 | 7/1998 | | H04N/5/253 |
| WO | 9834157 | 8/1998 | | |
| WO | 9834397 | 8/1998 | | |
| WO | WO 98/34397 | 8/1998 | | |
| WO | 9940729 | 8/1999 | | |
| WO | WO 99/40729 | 8/1999 | | H04N/9/11 |
| WO | WO 01/48694 | 7/2001 | | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD.. pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Digital Imaging Equipment White Papers*, Putting Damaged Film on Ice, A Technical Discussion of Advances on Digital Imaging, Nikon Corporation, http://www.nikonusa.com/reference/whitepapers imaging.ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com.html.o_products.iceprod.html, Aug. 5, 1999.

*About Digital ICE Technology*, Applied Science Fiction, Inc., http://www.asf.com.html.o_products.icetech.html, Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp 180–182.

* cited by examiner

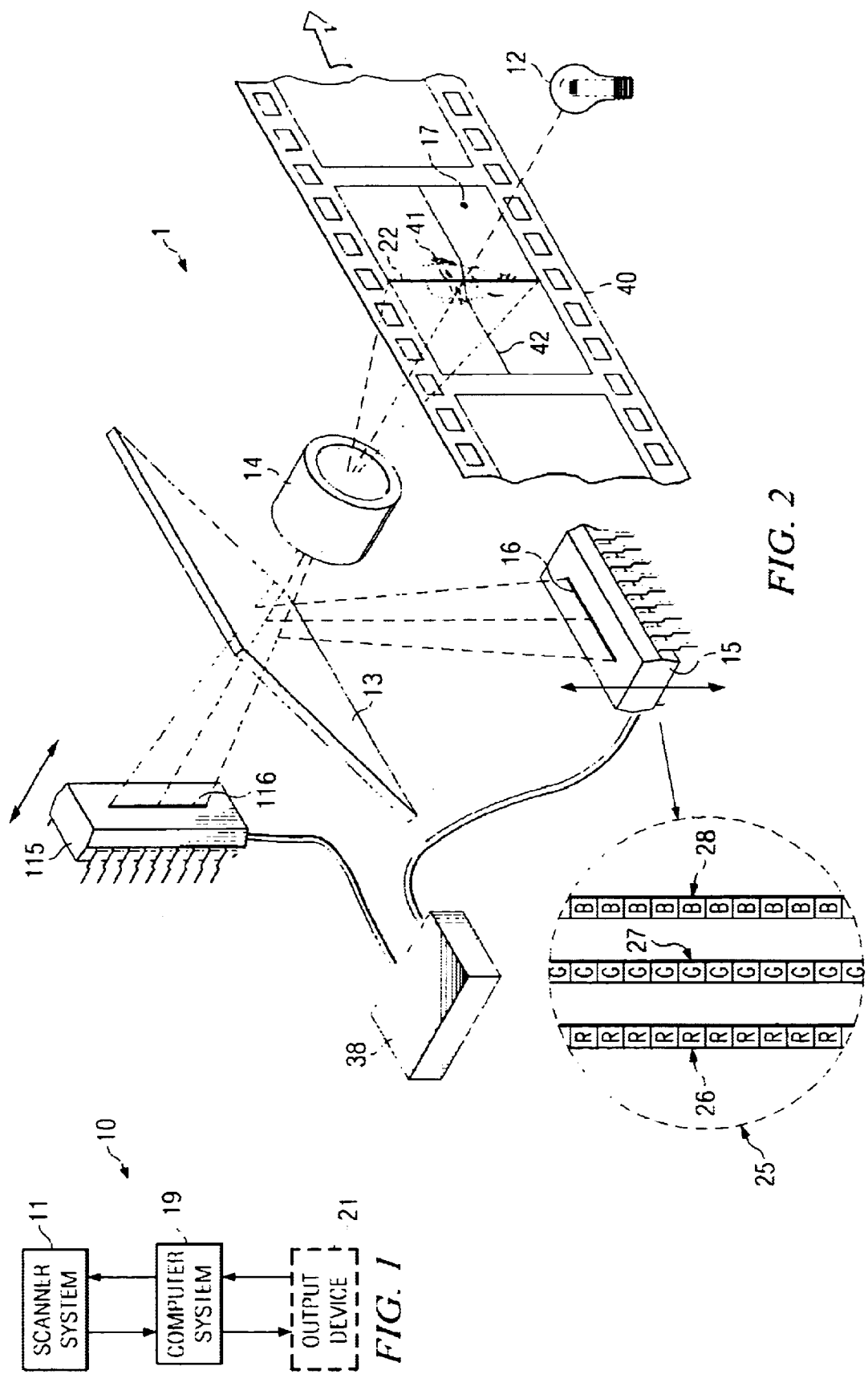

METHOD AND APPARATUS FOR SCANNING IMAGES

This application claims the benefit of No. 60/174,067, filed Dec. 30, 1999.

BACKGROUND OF THE INVENTION

1. Field of the Invention

The present invention relates to the generation of a digital representation of an image, such as by scanning an image with light. More particularly, one embodiment of the present invention provides a method and system which may be used to correct image defects.

2. Description of Related Art

Photographs, slides, documents and other images are often electronically scanned to produce an electronic or digital representation of the image. The digital representation of the image is often captured, for example, by scanning the image with light in order to generate a digital representation of the image. The digital representation of the image may be stored (e.g., as a data file stored on an optical or magnetic disc), manipulated, displayed (such as on a video monitor or other suitable display device), and/or used to prepare a reproduction of the image on a medium (e.g., printed on a suitable substrate such as paper).

Since image capture techniques such as scanning essentially produce a digital "copy" of the original image, the digital copy will necessarily include any defects present in the image substrate. For example, surface defects such as dust, scratches, fingerprints, smudges, and the like which are present on the original image substrate will also be present in the digital representation of that image generated by scanning.

Recently, methods for eliminating defects in electronically captured images have been developed. For example, one conventional method utilizes both visible and infrared light for scanning. The addition of an infrared scan allows surface defects to be eliminated from the digital representation of the image. While scanning an image with both visible and infrared light is an effective technique for eliminating image defects, this method can be difficult to implement.

SUMMARY OF THE INVENTION

The present invention provides a method for generating a digital representation of an image, comprising: applying visible and infrared light to an image storing medium which includes the image; directing the visible and infrared light which is reflected from or transmitted through the image storing medium to a reflective surface, wherein the visible light is reflected by the reflective surface towards a first sensor and the infrared light is transmitted through the reflective surface towards a second sensor; detecting the visible light which is reflected from or transmitted through the image storing medium at the first sensor in order to provide a first image signal; and detecting the infrared light which is reflected from or transmitted through the image storing medium at the second sensor in order to provide a second image signal. The second image signal may be used to modify the first image signal to generate a modified digital representation of the image. Alternatively, the visible light may be transmitted through the reflective surface towards the first sensor, and the infrared light reflected by the reflective surface towards the second sensor.

The visible and infrared light may be applied simultaneously to the image storing medium from the same light source, or separate infrared and visible light sources may be utilized. The system may be configured such that the visible light may be focused on the first sensor, and the infrared light may be focused on the second sensor. For example, the optical distance between the image storing medium and the first sensor may be different from the optical distance between the image storing medium and the second sensor, thus allowing the visible and infrared light to be individually focused on their respective sensors. In one embodiment, the reflective surface comprises a cold mirror, while in another embodiment the reflective surface comprises a hot mirror.

The first sensor may comprise a trilinear CCD array which is responsive to visible light, and the second sensor may comprise one or more linear CCD arrays which are responsive to infrared light (such as a conventional trilinear CCD array). The methods of the present invention may be employed with a variety of image storing media, particularly transparent media such as film (both positive and negative films). When a transparent media is employed, the detecting steps may comprise detecting light which is transmitted through the transparent medium.

A digital representation of an image generated by the above methods is also provided herein. The original image may include surface defects, while these surface defects are substantially absent in the digital representation of the image.

The present invention further provides a system for use in generating a digital representation of an image, and this system may comprise: one or more light sources operable to apply first and second types of light to an image storing medium having an image; a first sensor responsive to at least the first type of light; a second sensor responsive to at least the second type of light; and a reflective surface which reflects the first type of light and transmits the second type of light. The reflective surface may be positioned such that when the first and second types of light are applied to an image storing medium, the first type of light which is reflected from or transmitted through the image storing medium will be reflected towards the first sensor and the second type of light which is reflected from or transmitted through the image storing medium will be transmitted through the reflective surface towards the second sensor.

The system may also be configured such that the first type of light may be focused on the first sensor, and the second type of light may be focused on the second sensor. For example, the optical distance between the image storing medium and the first sensor and the optical distance between the image storing medium and the second sensor may be adjusted independently of one another. In one embodiment, the first and second sensors are movable with respect to the reflective surface such that the first and second types of light may be focused on their respective first and second sensors. The system may be configured, for example, as a scanner.

The first and second types of light are preferably of a different wavelength, with the wavelength of the second light chosen for acquiring data indicative of defects in the original image storing medium. In this manner, the second image signal provides a map of defects which may be used to modify the first image signal and generate a digital representation which does not include the defects. For example, the first light may comprise visible light, and the second light may comprise infrared light.

BRIEF DESCRIPTION OF THE DRAWINGS

FIG. 1 is a schematic representation of an imaging system according to the present invention for acquiring image data which may be used to generate a digital representation of an image;

FIG. 2 is a schematic representation of one exemplary embodiment of the scanner system portion of the imaging system of FIG. 1.

DETAILED DESCRIPTION OF THE PREFERRED EMBODIMENTS

Figure 3:
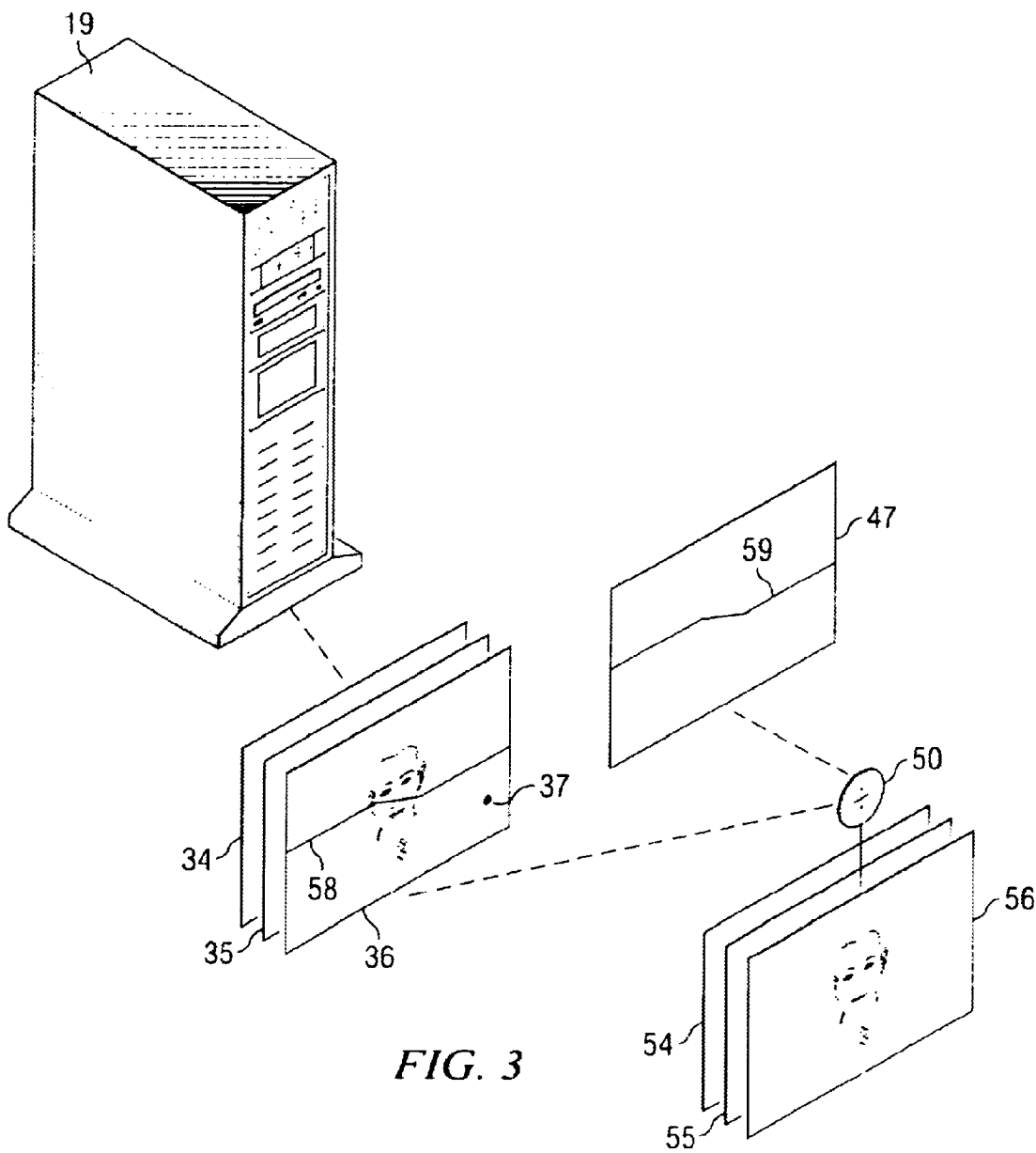
FIG. 3 is a schematic representation of the manner in which image data acquired by the scanner system of the present invention may be used to eliminate defects from a digital representation of an image.

The present invention provides methods and apparatus for simultaneously scanning an image with two different types of light (such as visible and infrared light). The methods and apparatus can be used, for example, to correct image defects. Light which is reflected from or transmitted through the image storing medium is directed to a pair of sensors by a reflective surface (such as a cold mirror or a hot mirror) which reflects one type of light while transmitting the other. Infrared light, for example, may be transmitted through the reflective surface to a first sensor, while visible light is reflected by the reflective surface to a second sensor. Alternatively, visible light may be transmitted through the reflective surface to a first sensor, while infrared light is reflected by the reflective surface to a second sensor. In this manner, an image can be simultaneously scanned with infrared and visible light. In addition, the two different types of light (such as visible and infrared light) can be individually focused on their respective sensors (such as by adjusting the focal plane or by adjusting the positioning of the sensor).

Conventional scanning systems typically utilize only visible light for purposes of scanning an image on a substrate. If the image includes surface defects such as dust, scratches, or fingerprints, light directed at the substrate will be attenuated by the surface defects. If a particular point of the image includes a surface defect, less light will reach the sensor, and each of the three image records (i.e., red, green and blue) will therefore include an intensity value for the pixel corresponding to that point which is too low. When the digital representation of the image is viewed or printed, the defect will appear as a darkened area.

As described in U.S. Pat. No. 5,266,805, which is incorporated herein by reference, as well as U.S. Patent Application Serial No. 60/073,602 (filed Feb. 4, 1998), image defects may be substantially eliminated by employing an infrared scan in addition to the visible light scan. Infrared light applied to the image is attenuated by any surface defects to nearly the same extent that visible light is attenuated by the surface defects. In the case of a film substrate wherein the image is formed from colored dyes, the dyes are generally transparent to infrared light. Thus, if the image is scanned with infrared light, the image itself will generally not attenuate the infrared light, and the resulting infrared image record will only include data indicative of the surface defects. The infrared image record may thereafter be employed to eliminate any surface defects from the red, green and blue image records, thus providing a digital representation of the image which is substantially free of any surface defects present in the original image.

Most sensors used for acquiring image data during scanning are responsive to both visible and infrared light. Conventional systems used for scanning an image with both visible and infrared light generally scan with visible light at a different time than the infrared light. Accordingly, the infrared and visible light scans occur separately. In some conventional applications, the visible light is blocked or turned off during the infrared scan. Other conventional applications turn on and turn off the respective light sources. While LED's or similar visible light sources can be quickly turned off and on, more commonly used light sources (such as fluorescent lights) take considerably longer time to warm up and reach the required stable intensity. Accordingly, conventional systems for turning the light sources on and off generally cause further delays in scanning subsequent images. The present invention allows for the infrared scan to take place concurrently with the visible light scan (i.e., without turning off and on the visible light source).

FIG. 1 depicts an imaging system 10 according to the present invention. Imaging system 10 includes a scanner system 11 and a computer system 19. As described in greater detail below, scanner system 11 is employed to acquire image data from an image, and the acquired image data may be transmitted to computer system 19 for further processing. As is well known to those skilled in the art, computer system 19 may also be employed to control the operation of scanner system 11. Computer system 19 may comprise any device which is capable of processing data in accordance with one or more instructions, and generally includes a CPU and memory. Examples include a personal computer, workstation, server, mainframe, embedded system, microprocessor, discrete logic system, and the like. Computer system 19 processes data received from scanner system 11 in order to generate a digital representation of the original image. It should be noted that computer system 19 need not be physically separate from scanner system 11, since these components of imaging system 10 may be physically combined with one another.

The digital representation of the scanned image generated by computer system 19 may be stored in a computer readable medium. Suitable computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. The digital representation of the scanned image 11 may also be transmitted to an output device 21 which is optionally included in imaging system 10. Output device 21 may comprise any device for displaying or printing a digital representation of an image, such as a video monitor or a printing device (such as a laser printer, or other suitable device for printing images onto a substrate).

Scanner system 11 is depicted in FIG. 2, and generally comprises a light source 12 and sensors 15 and 115. Scanner system 11 may be used to scan an image on an image storing medium. Scanning generally comprises applying light to the image, and detecting light which is reflected from and/or transmitted through the image. In the embodiment of scanner system 11 shown in FIG. 2, first light source 12 is operable to apply both visible and infrared light to an image storing medium, such as film 40 having an image 41 thereon. Additional optics may be positioned between light source 12 and the image to be scanned in order to, for example, illuminate image 11 more uniformly.

One of sensors 15 and 115 may be used to detect visible light, while the other may be used to detect infrared light. A pair of sensors are employed in order to simultaneously acquire image data from both the visible scanning light and the infrared scanning light. Sensors 15 and 115, however, may be physically separated from one another, and the scanning light is therefore split into its visible and infrared components prior to reaching sensors 15 and 115. A reflective surface 13 (such as a cold mirror or a hot mirror) reflects either the visible or infrared light towards sensor 15, while the other, non-reflected light is transmitted through reflective surface 13 towards sensor 115. By way of example, when reflective surface 13 comprises a cold mirror, the visible light is reflected towards sensor 15, while the infrared light is transmitted through reflective surface 13 towards sensor 115. In another embodiment, when reflective surface 13 comprises a hot mirror, the infrared light is reflected towards sensor 15, while the visible light is transmitted through reflective surface 13 towards sensor 115.

Light source 12 is operable to apply both visible light (particularly white light) and infrared light concurrently to the image storing medium. First light source 12 may include any of a variety of apparatus capable of emitting both visible and infrared light, including conventional lamps (such as an incandescent, fluorescent or halogen lamp), LED's, and direct gas discharge lamps (such as xenon lamps). Filters, or other wavelength modifiers or limiters may be included in first light source 12 so that light source 12 is operable to apply visible and infrared light to the image storing medium. In another embodiment, separate visible and infrared light sources are employed in order to direct visible and infrared light at the image storing medium.

Optics, such as lens 14 (or a plurality of lenses and/or other optical elements), may also be provided in order to focus or otherwise direct the light transmitted through image 41 onto sensors 15 and 115. Additional optics may also be provided between reflective surface 13 and the sensors 15 and 115 in order to further focus or otherwise direct the light transmitted through image 41 onto the sensors. In an alternative embodiment, lens 14 may be replaced by focusing optics (such as one or more lenses) positioned between reflective surface 13 and one or both of sensors 15 and 115.

By way of example, scanner system 11 may be used to scan an image storing medium comprising film 40 having an image 41 thereon. When light from light source 12 is applied to image 41, the visible portion of light passing through film 40 is attenuated by image 41. In the embodiment of FIG. 2 wherein reflective surface 13 comprises a cold mirror, the visible light transmitted through image 41 is directed to sensor 15 by reflective surface 13. Sensor 15 detects the amount of light transmitted through image 41, and generates an electrical signal in response thereto. This electrical signal is representative of image 41, and may thereafter be processed in order to generate a digital representation of the image.

As seen in FIG. 2, image 41 includes a surface defect 42 (such as a scratch). If image 41 is scanned only with visible light, the resulting digital representation of image 41 will include defect 42, since the visible light will be attenuated by both image 41 and defect 42. In order to eliminate surface defect 42 from the digital representation of image 41, image 41 is also scanned with infrared light.

The infrared scan used to generate a defect image record is performed concurrently with the visible light scan described above (such as by employing a light source 12 which emits both visible and infrared light). The infrared light applied to film 40 is attenuated only by surface defect 42 of image 41, since the dyes which form image 41 will generally not attenuate infrared light. The infrared light transmitted through image 41 is then directed to sensor 115. By way of example, lens 14 may be used to direct both infrared and visible light transmitted through image 41 in the direction of reflective surface 13. As discussed previously, the visible light is reflected from reflective surface 13 in the direction of sensor 15. The infrared light, however, is transmitted through reflective surface 13 such that it continues in the direction of sensor 115. As discussed previously, in another embodiment reflective surface 13 comprises a hot mirror which reflects infrared light and transmits visible light.

In the embodiment shown in FIG. 2, sensor 115 detects the amount of infrared light transmitted through image 41, and generates an electrical signal in response thereto. This electrical signal is representative of the surface defects of image 41, and may thereafter be processed in order to remove such surface defects from the digital representation of image 41.

The scanner system of the present invention may employ any of a variety of light responsive sensors 15 and 115 (i.e., any sensor which can generate an electrical signal in response to light). Suitable sensors include phototransistors, photoresistors, charge coupled devices (CCD's), time delay integration arrays ("TDI" arrays), or any other device capable of responding to light. It should be pointed out that the term CCD is typically used generically in the art to refer to a semiconductor sensor array. The sensor may include one or more individual sensor elements, each of which is light responsive. A CCD sensor, for example, will include a one or more individual photosensitive elements, such that each sensor element of the CCD acquires image data corresponding to a discrete, typically very small, region of the image being scanned. A plurality of individual sensor elements may be arranged in an array to allow for the scanning of an entire area of an image at one time. Alternatively, a plurality of individual sensor elements may be arranged in one or more rows such that the CCD sensor will acquire image data on a line by line (rather than area) basis. A single sensor element, or two or more individual sensor elements wherein each sensor element is sensitive to visible light of a particular color, may also be employed, such that the sensor element will acquire image data on a point by point basis.

In the exemplary scanner system depicted in FIG. 2, sensor 15 comprises a CCD sensor having a trilinear array of photosensitive elements. Thus, as shown by magnified portion 25, sensor 15 actually comprises three parallel rows of individual sensor elements, wherein each row is sensitive to visible light of a particular color (as well as infrared light). For example, a first row 26 of sensor elements is responsive to red visible light, whereas a second row 27 of sensor elements is responsive to green visible light and a third row 28 of sensor elements is responsive to blue visible light. All three rows of sensor elements may also be responsive to infrared light, in addition to the particular color of visible light noted above. However, as described previously, in the embodiment shown in FIG. 2. the infrared light used for scanning is generally not directed to sensor 15 when reflective surface 13 comprises a cold mirror.

Sensor 115 may comprise any of the various types of sensors described above which are responsive to infrared light. For example, sensor 115 may also comprise a CCD sensor having a one or more linear arrays of photosensitive elements, such as a trilinear array. All three rows of sensor elements in commercially-available trilinear arrays are typically responsive to infrared light. Thus, when sensor 115 comprises such a trilinear array, one or more rows of sensor elements may be used to detect infrared scanning light. Of course a linear sensor having a single row of infrared-sensitive sensor elements may also be employed as sensor 115.

As noted in FIG. 2, when sensor 15 comprises a trilinear array, the light responsive region 16 of sensor 15 projects back through lens 14 as a line 22 extending vertically across image 41. When sensor 115 also comprises a linear array (such as a trilinear array), sensor 115 may be positioned such that the light responsive region 116 of sensor 115 projects back through lens 14 as the same line 22. Thus, each sensor element of first row 26 of sensor 15 will provide a signal corresponding to the red component of an individual point along projection line 22 of image 41. By scanning across the width of image 41 of film 40 (such as by advancing film 40 in the direction shown), the red, green and blue components of each point of image 41 will be acquired by sensor rows 26, 27 and 28, respectively, of sensor 15, and the image defect data of each point will be acquired by sensor 115.

In order to scan the entire width of image 41, film 40 must be moved perpendicularly to projection line 22, as shown. In this manner, image and defect data will be acquired by sensors 15 and 115 on a line by line basis. Alternatively, film 40 may remain stationary and sensors 15 and 115, lens 14 and/or light source 12 may be moved in order to scan across the width of image 41. Of course other types of sensors may negate the need to advance film 40 in order to scan the entirety of image 41 (such as a CCD area sensor), or may necessitate other scanning patterns.

In the embodiment of FIG. 2, sensor 15 provides an electrical signal representative of image 41, while sensor 115 provides an electrical signal representative of any surface defects on image 41. In other words, sensor 15 provides image data which may be used to generate a digital representation of image 41, and sensor 115 provides surface defect data which may be used to remove surface defects from the digital representation of image 41. Before transmitting the image and defect data to computer system 19 for further processing, scanner system 11 may process the image data in order to provide a more suitable data stream for computer system 19. Thus, as is well-known to those skilled in the art, scanner system may include an analog-to-digital converter 38, as shown in FIG. 2. In this manner, image and defect data from sensors 15 and 115 will be converted into one or more digital signals to be transmitted to computer system 19. Scanner system 11 may also include a pre-processor means for further processing the image and defect data signals prior to their transmission to computer system 19. In fact, commercially-available sensors, including trilinear arrays, typically are provided on a unitary circuit board which includes not only the sensor, but also an analog-to-digital convertor, a pre-processor means, and other circuitry capable of transmitting a suitable digital signal comprising the data acquired by the sensor during scanning.

The image data acquired by sensor 15 is converted into a digital signal by A/D converter 38, and is transmitted to computer system 19 for further processing. The acquired image data (from sensor 15) transmitted to computer system 19 generally comprises three numeric values for each point of image 41. Scanner system 11 will provide to computer system 19 numeric values corresponding to the red, green and blue light intensity levels of each point in image 41 (including any surface defects in the image substrate).

Computer system 19 processes the data received from scanner system 11 in order to provide red, green and blue image records 34, 35 and 36, respectively (as shown in FIG. 3). Each of these digital image records comprises a series of numeric values which describe the intensity of the particular color of light at each pixel of the image record. For example, pixel 37 of blue image record 36 will contain a number indicating the intensity of the blue component of point 17 of image 41. Each point of image 41 will have a corresponding pixel value in each of the three digitized image records 34, 35 and 36. These three image records may then be stored by computer 19 as a digital representation of image 41 (i.e., a file, which may be stored in a compressed or uncompressed form. The digital representation of image 41 may thereafter be retrieved in order to display (such as on a video monitor) or print (such as using a laser printer or other suitable printer) image 11. Of course each of the three visible light image records 34, 35 and 36 will include surface defect 42, since such surface defect attenuates red, green and blue light.

The infrared defect data is processed by scanner system 11 in a manner similar to that described above for the visible light data. Thus, the infrared defect data acquired by sensor 115 is converted into a digital signal by A/D converter 38, and is transmitted to computer system 19 for further processing. The infrared defect data is processed by computer 19 in order to produce a fourth digital image record 47 (see FIG. 3). The dyes which form image 41 do not generally attenuate infrared light, and infrared image record 47 will therefore only include data indicative of defect 42. Infrared image record 47 may be used to eliminate surface defects from the red, green and blue image records 34, 35 and 36, respectively. In essence, infrared image record 47 will indicate which pixels include an image defect and the amount by which such image defect attenuates light transmitted through the original image 41. Therefore, any such pixels can be corrected in the red, green and blue image records (34, 35, 36) using infrared image record 47 as a map.

Various algorithms known to those skilled in the art may be used to remove the defect data from the three visible light image records. Exemplary algorithms are described. for example. in U.S. Pat. No. 5,266,805 and U.S. Patent Application Serial No. 60/073,602 (filed Feb. 4, 1998), both of which are incorporated herein by way of reference. For example, a defect-containing pixel 58 in blue image record 36 may have a numerical value indicative of a 40% brightness measurement. The brightness of this pixel should be 50%, however surface defect 42 of the original image 41 has reduced the amount of visible light which reached the sensor during scanning by 20%. The corresponding pixel 59 in the infrared image record 47 may have a numerical value indicative of an 80% brightness measurement because the surface defect has attenuated 20% of the infrared light directed at the point in image 41 which corresponds to pixel 59 of infrared image record 47. Function block 50 simply divides the 40% brightness level for pixel 58 by the 80% brightness measurement corresponding to pixel 59 of infrared image record 47, thereby providing a corrected brightness value of 50% for pixel 58 of blue image record 36. This division is repeated for each pixel of the red, green and blue image records in order to generate corrected brightness values for each pixel wherein the effect of surface defect 42 on the brightness values is eliminated. In this manner, corrected red, green and blue image records 54, 55 and 56, respectively, are produced. These three corrected image records may then be combined in the manner well-known to those skilled in the art to provide a digital representation of the original image 41, minus surface defect 42.

It should be noted that elimination of the surface defect using function block 50 and the method described above is merely exemplary of one possible technique. Function block 50 may be included in software contained in computer system 19 in order to allow for processing of the four image records, as described above.

When visible and infrared light are transmitted through the same optics (such as lens 14), the focal plane (i.e., the plane upon which the light is focused) for the infrared light will be displaced relative to the focal plane for the visible light. Conventional systems used for scanning an image with both visible and infrared light generally use the same sensor for detecting both visible and infrared light. The image is simply scanned with visible light at a different time than with infrared light. Because of the focal plane displacement described above, the infrared light delivered to the sensor is somewhat diffused (i.e., not sharply focused), thereby reducing the effectiveness of the defect correction.

The present invention overcomes the problem of focal plane displacement in that the visible and infrared scanning light may be individually focused on their respective sensors. Individual focusing may be accomplished by altering the focal planes for the infrared and visible light and/or by positioning sensors 15 and 115 to correspond to the focal plane of the visible and infrared light, respectively.

In one embodiment, the optical distance from film 40 to sensor 15 may be different than the optical distance from film 40 to sensor 115 in order to account for the focal shift noted above. For example, the distance from reflective surface 13 to sensor 15 may be different than the distance from reflective surface 13 to sensor 115, thus allowing the infrared and visible light to be precisely focused on their respective sensors. As shown in FIG. 2, the scanner system also may be configured such that each sensor may be independently moved relative to reflective surface 13 in order to individually and independently focus the infrared and visible light on their respective sensors.

Alternatively, additional optics (such as one or more lenses) may be provided between reflective surface 13 and each sensor in order to allow the visible and infrared light to be individually focused on their respective sensors. In this manner, both the visible and the infrared light transmitted through image 41 can be precisely focused on sensors 15 and 115, respectively (i.e., each sensor is positioned at the proper focal plane). These additional optics may even be adjustable to allow each type of light to be focused on the appropriate sensor, with or without altering the position of the sensor.

While adjusting the focusing of the visible and infrared light on their respective sensors may also result in a change in magnification, magnification differences between the visible and infrared light may be adjusted or compensated for. Thus, software may be employed to recalibrate size and registration of the visible and infrared data based on a known scanned image. Alternatively, additional optics which affect or stabilize magnification may be used (such as between reflective surface 13 and one or both of sensors 15 and 115).

It should also be pointed out that FIG. 1 depicts a transmission scan wherein line sensor 15 detects light which has been directed through image 11 on film 10. While such an arrangement is suitable for the scanning of transparent substrates such as photographic film (both negative and positive images), it is not suitable for scanning photographic prints or other opaque image storing mediums. Therefore, a reflection scan should be used for such materials. In a reflection scan, visible light from a suitable light source is once again applied to the substrate having the image. A CCD, or other suitable sensor, is used to detect light which is reflected from the image, rather than light which is transmitted through the image. The image data gathered by the sensor, however, is processed in the same manner as that described above for the scanner system shown in FIG. 2.

What is claimed is:

1. A method for generating a digital representation of an image, comprising:
   (a) applying visible and infrared light to an image storing medium which includes the image;
   (b) directing said visible and infrared light which is reflected from or transmitted through said image storing medium to a reflective surface, wherein said visible light is reflected by said reflective surface towards a first sensor and said infrared light is transmitted through said reflective surface towards a second sensor;
   (c) detecting said visible light which is reflected from or transmitted through said image storing medium at said first sensor in order to provide a first image signal; and
   (d) detecting said infrared light which is reflected from or transmitted through said image storing medium at said second sensor in order to provide a second image signal;

whereby said second image signal may be used to modify said first image signal to generate a modified digital representation of said image; and wherein the optical distance between said image storing medium and said first sensor is different from the optical distance between said image storing medium and said second sensor.

2. The method of claim 1, wherein said visible and infrared light are applied to the image storing medium from the same light source.

3. The method of claim 1, wherein said visible and infrared light are applied to the image storing medium from separate light sources.

4. The method of claim 1, wherein said visible and infrared light are simultaneously applied to said image storing medium.

5. The method of claim 4, wherein said first sensor comprises a trilinear CCD array.

6. The method of claim 5, wherein said second sensor comprises one or more linear CCD arrays.

7. The method of claim 1, wherein said image storing medium comprises film, and wherein said steps of detecting visible and infrared light comprise detecting light which is transmitted through said film.

8. The method of claim 1, wherein said reflective surface comprises a cold mirror.

9. The method of claim 1, wherein the optical distance between said image storing medium and said first sensor and the optical distance between said image storing medium and said second sensor may be adjusted independently of one another.

10. The method of claim 9, wherein said first sensor is moveable to adjust the optical distance between said image storing medium and said first sensor.

11. The method of claim 9, wherein said second sensor is moveable to adjust the optical distance between said image storing medium and said second sensor.

12. A method for generating a digital representation of an image, comprising:
   (a) applying visible and infrared light to an image storing medium which includes the image;
   (b) directing said visible and infrared light which is reflected from or transmitted through said image storing medium to a reflective surface, wherein said visible light is transmitted through said reflective surface towards a first sensor and said infrared light is reflected by said reflective surface towards a second sensor;
   (c) detecting said visible light which is reflected from or transmitted through said image storing medium at said first sensor in order to provide a first image signal; and
   (d) detecting said infrared light which is reflected from or transmitted through said image storing medium at said second sensor in order to provide a second image signal; and whereby said second image signal may be used to modify said first image signal to generate a modified digital representation of said image; and wherein the optical distance between said image storing medium and said first sensor is different from the optical distance between said image storing medium and said second sensor.

13. The method of claim 12, wherein said visible and infrared light are applied to the image storing medium from the same light source.

14. The method of claim 12, wherein said visible and infrared light are applied to the image storing medium from separate light sources.

15. The method of claim 12, wherein said visible and infrared light are simultaneously applied to said image storing medium.

16. The method of claim 15, wherein said first sensor comprises a trilinear CCD array.

17. The method of claim 16, wherein said second sensor comprises one or more linear CCD arrays.

18. The method of claim 12, wherein said image storing medium comprises film, and wherein said steps of detecting visible and infrared light comprise detecting light which is transmitted through said film.

19. The method of claim 12 wherein said reflective surface comprises a hot mirror.

20. The method of claim 12, wherein the optical distance between said image storing medium and said first sensor and the optical distance between said image storing medium and said second sensor may be adjusted independently of one another.

21. The method of claim 20, wherein said first sensor is moveable to adjust the optical distance between said image storing medium and said first sensor.

22. The method of claim 20, wherein said second sensor is moveable to adjust the optical distance between said image storing medium and said second sensor.

23. A system for use in generating a digital representation of an image, comprising:
   (a) one or more light sources operable to apply first and second types of light to an image storing medium having an image;
   (b) a first sensor responsive to at least said first type of light;
   (c) a second sensor responsive to at least said second type of light; and
   (d) a reflective surface which reflects said first type of light and transmits said second type of light, said reflective surface positioned such that when said first and second types of light are applied to an image storing medium, said first type of light which is reflected from or transmitted through said image storing medium will be reflected towards said first sensor and said second type of light which is reflected from or transmitted through said image storing medium will be transmitted through said reflective surface towards said second sensor;
wherein the system is configured such that the optical distance between said image storing medium and said first sensor is different from the optical distance between said image storing medium and said second sensor.

24. The system of claim 23, wherein said system is configured such that said first type of light may be focused on said first sensor, and said second type of light may be focused on said second sensor.

25. The system of claim 23, wherein said system is configured such that the optical distance between said image storing medium and said first sensor and the optical distance between said image storing medium and said second sensor may be adjusted independently of one another.

26. The system of claim 23, wherein said reflective surface is chosen from the group consisting of a hot mirror and a cold mirror.

27. The system of claim 23, wherein said first type of light comprises visible light, and said second type of light comprises infrared light.

28. The system of claim 23, wherein said first type of light comprises infrared light, and said second type of light comprises visible light.

29. The system of claim 23, further comprising single light source operable to apply said first type and said second type of light to an image storing medium.

30. The system of claim 23, wherein said system comprises a scanner.

31. The system of claim 30, wherein said first type of light comprises visible light, said second type of light comprises infrared light, said first sensor comprises a trilinear CCD array and said second sensor comprises one or more linear CCD arrays.

32. The system of claim 30, wherein said first type of light comprises infrared light, said second type of light comprises visible light, said second sensor comprises a trilinear CCD array and said first sensor comprises one or more linear CCD arrays.

33. A digital representation of an image, generated by the method comprising:
   (a) applying a visible and infrared light to an image storing medium which includes the image;
   b) directing said visible and infrared light which is reflected from or transmitted through said image storing medium to a reflective surface, wherein one of said visible and infrared light is reflected by said reflective surface towards a first sensor and the other is transmitted through said reflective surface towards a second sensor, and further wherein the optical distance between said image storing medium and said first sensor is different from the optical distance between said image storing medium and said second sensor;
   (c) detecting said visible light which is reflected from or transmitted through said image storing medium in order to provide a first image signal;
   (d) detecting said infrared light which is reflected from or transmitted through said image storing medium in order to provide a second image signal; and
   (e) modifying said first image signal by said second image signal in order to generate a modified digital representation of said image.

34. The digital representation of claim 33, wherein said image includes surface defects, and wherein said surface defects are substantially absent in said digital representation of the image.

* * * * *